United States Patent [19]

Iwatsuka et al.

[11] Patent Number: 5,640,516
[45] Date of Patent: Jun. 17, 1997

[54] FARADAY ROTATOR

[75] Inventors: Shinji Iwatsuka; Kazuhito Yamasawa; Masaaki Kobayashi, all of Tokyo, Japan

[73] Assignee: TDK Corporation, Tokyo, Japan

[21] Appl. No.: 62,690

[22] Filed: May 17, 1993

Related U.S. Application Data

[63] Continuation of Ser. No. 757,360, Sep. 10, 1991, abandoned.

[30] Foreign Application Priority Data

Apr. 2, 1991 [JP] Japan .................. 3-094851
Jul. 23, 1991 [JP] Japan .................. 3-205678

[51] Int. Cl.$^6$ .................................... G02F 1/09
[52] U.S. Cl. .................. 359/280; 359/281; 359/282; 359/324; 359/484
[58] Field of Search ................. 359/280, 281, 359/282, 283, 483, 484, 324

[56] References Cited

U.S. PATENT DOCUMENTS

| | | | |
|---|---|---|---|
| 3,784,281 | 1/1974 | Kuse . | |
| 3,989,352 | 11/1976 | Lacklison et al. | 252/583 |
| 4,522,473 | 6/1985 | Hibiya et al. | 359/283 |
| 4,604,577 | 8/1986 | Matsumura et al. | 359/324 |
| 4,728,178 | 3/1988 | Gualtieri et al. | 359/282 |
| 4,856,878 | 8/1989 | Wilson et al. | 359/281 |
| 4,896,103 | 1/1990 | Shimanuki et al. | 359/281 |
| 4,981,341 | 1/1991 | Brandle, Jr. et al. | 359/484 |
| 5,043,231 | 8/1991 | Miyazawa et al. | 359/484 |
| 5,058,971 | 10/1991 | Schmitt et al. | 359/484 |
| 5,087,984 | 2/1992 | Heiney et al. | 359/283 |
| 5,111,330 | 5/1992 | VanDelden et al. | 359/484 |
| 5,146,361 | 9/1992 | Licht | 359/484 |

FOREIGN PATENT DOCUMENTS

| | | | |
|---|---|---|---|
| 0279412 | 8/1988 | European Pat. Off. | 359/484 |
| 0338859 | 10/1989 | European Pat. Off. | 372/703 |
| 2843327 | 4/1979 | Germany | 359/281 |
| 60-134404 | 7/1985 | Japan | 359/281 |
| 61-292613 | 12/1986 | Japan | 359/484 |

OTHER PUBLICATIONS

Kaoru Matusda et al., "Temperature–stabilized optical isolator for collimated light using $(BiLuGd)_3Fe_5O_{12}/(BiGd)_3(FeGa)_5O_{12}$ composite film" *Applied Optics*, vol. 27, No. 7, pp. 1329–1333 (1988).

O. Kamada et al., "Application of Bismuth–Substituted Iron Garnet Films To Magnetic Field Sensors", *Advances in Magneto–Optics*, pp. 401–404 (1987).

Y. Honda et al., "Temperature Dependence of Faraday Rotation For Bi–Substituted Tb Iron Garnet Films", *Advances in Magneto–Optics*, pp. 361–364 (1987).

Taketoshi Hibiya et al., "Growth and Magneto–Optic Properties of Liquid Phase Epitaxial Bi–Substituted Garnet Films for Optical Isolator", *NEC Research & Development*, pp. 1–9 (1986).

*Primary Examiner*—Ricky D. Shafer
*Attorney, Agent, or Firm*—Seidel, Gonda, Lavorgna & Monaco, PC

[57] ABSTRACT

A Faraday rotator which comprises, in combination, a garnet material of an atomic ratio composition

$$Bi_xP_yQ_{3-x-y}Fe_{5-w}M_wO_{12}$$

in which P is one or more elements chosen from among Y, La, Sm, Eu, Tm, Yb, and Lu, Q is one or more elements chosen from among Gd, Tb, Dy, Ho, and Er, M is one or more nonmagnetic elements that can substitute for Fe, and $0.7 \leq x \leq 2.0$, $0.5 \leq y \leq 2.3$, $0 \leq 3-x-y \leq 1$, and $0. \leq w \leq 1.0$, and a magnet for applying a magnetic field smaller than the saturation magnetic field to said material. Preferably, the value w ranges from 0.2 to 0.7, and a Faraday rotator especially excellent is one using a garnet material in which $M_w$ is represented by $A_kD_l$ where A is an element to be substituted for the site a of the garnet, selected, e.g., from among Sc, In, etc., D is an element to be substituted for the site d of the garnet, selected, e.g., from among Ga, Al etc., and $0 \leq k < 0.1$, $0.2 \leq l \leq 0.7$, and $w=k+l$.

9 Claims, 6 Drawing Sheets

FARADAY ROTATOR

This is a continuation of application Ser. No. 07/757,360 filed on Sep. 10, 1991, now abandoned.

BACKGROUND OF THE INVENTION

This invention relates to a Faraday rotator which, with little variation in the Faraday rotation angle with temperature, is suited for use in optical isolators, circulators, and switches.

Magnetic garnet materials are known materials constituting Faraday rotators used in optical isolators for the wavelength bands of 1.3 µm and 1.55 µm for optical communications.

Especially, Bi-substituted rare earth-iron garnet materials are promising because of their great Faraday rotation capacities, but they have a disadvantage of rather wide variations in Faraday rotation angle with temperature. Recently, improvements in the temperature characteristics through adjustments of garnet compositions have been proposed.

One example is patent application public disclosure No. 105931/1987. The invention suggests that $Tb_{2.6}Bi_{0.4}Fe_5O_{12}$ is an excellent composition which reduces the rate of change in rotation angle with temperature to almost zero. Its drawback is a small Faraday rotation coefficient (rotatability) because the Bi substitution is limited so as to improve the temperature characteristic. No material composition has hitherto been known to the art which involves adequately large Bi substitution and is capable of reducing the temperature variation to practically naught.

As an approach other than the adjustment of composition, Utility Model Application Publication No. 9376/1986 discloses a temperature-compensated optical isolator. The amount of temperature variation of Faraday rotation angle is compensated by a change in the applied magnetic field. It is an effective way of improving the temperature characteristic, and the present invention utilizes this principle. The cited invention has shortcomings, however, in that the necessity of magnetic adjusting steel besides a permanent magnet makes the construction complex and that the isolator is intended for use in the wave band of 0.8 µm.

The magnetic garnet materials presently in use as Faraday rotators for near infrared wavelengths (1.3 µm and 1.55 µm) are usually used in saturation magnetic fields. They are superior in that they undergo no change in Faraday rotation angle despite minor changes in the external magnetic field. However, as noted above, the larger the Bi content the lower the temperature characteristic, and the smaller the Bi content the smaller the rotatability and the thicker the film required.

Figure 1:
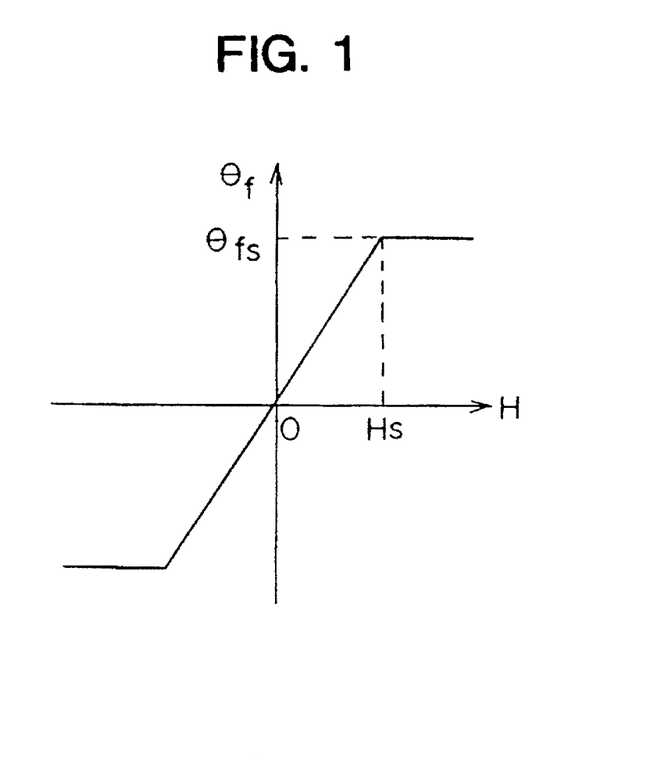
FIG. 1 is a graphic representation of the characteristic of a Faraday rotator.

Generally, as typically shown in FIG. 1, the application of a magnetic field H to a rare earth-iron garnet causes a change in the Faraday rotation angle. Above the saturation magnetic field $H_s$, the Faraday rotation angle at the saturation value $\Theta_{fs}$ will no longer change.

As a Faraday rotator for optical isolator this garnet is usually used in a saturation magnetic field ($H > H_s$), and the $\Theta_{fs}$ often is simply called Faraday rotation angle.

A rare earth-iron garnet with a large Bi substitution is advantageously characterized by a large Faraday rotatability ($\Theta_{fs}$/thickness) but, on the other hand, has the disadvantage of substantial changes in the $\Theta_{fs}$ with temperature. For example, with a $Bi_xR_{3-x}Fe_5O_{12}$ (where R is a rare earth), usually the temperature coefficient of $\Theta_{fs}$ is about $-0.15\%/°C$. when $x > 0.5$.

In brief, a Faraday rotator of a composition which involves limited change in rotation angle with temperature as taught in patent application Public Disclosure No. 105931/1987 has a low Faraday rotation coefficient (rotatability) because of limited Bi substitution. On the other hand, the device equipped with a temperature compensator as in Utility Model application Publication No. 9376/1986 is complex in construction and requires cumbersome adjustments.

The present invention therefore has for its object the provision of a Faraday rotator which is low in temperature dependence and large in Faraday rotation angle.

SUMMARY OF THE INVENTION

This invention provides a Faraday rotator which comprises, in combination, a garnet material of an atomic ratio composition $Bi_xP_yQ_{3-x-y}Fe_{5-w}M_wO_{12}$ in which P is one or more elements chosen from among Y, La, Sm, Eu, Tm, Yb, and Lu, Q is one or more elements chosen from among Gd, Tb, Dy, Ho, and Er, M is one or more nonmagnetic elements that can substitute for Fe, and $0.7 \leq x \leq 2.0$, $0.5 \leq y \leq 2.3$, $0 \leq 3-x-y \leq 1$, and $0 \leq w \leq 1.0$, and a magnet for applying a magnetic field smaller than the saturation magnetic field to said material preferably, the value w ranges from 0.2 to 0.7, and a Faraday rotator especially excellent is one using a garnet material in which $M_w$ is represented by $A_kD_l$ where A is an element to be substituted for the site a of the garnet, selected, e.g., from among Sc, In, etc., D is an element to be substituted for the site d of the garnet, selected, e.g., from among Ga, Al, etc., and $0 \leq k < 0.1$, $0.2 \leq l < 0.7$, and $w = k + l$. The terms "site a" and "site d" are known in the sterochemical study of materials such as ferromagnetics, and are associated with the determination and preference of the substituents ions between materials. The site (a) is related to octahedral symmetry associated with the electronic configuration of atoms and site (d) is related to the tetrahedral symmetry also associated with the electronic configuration of atoms.

The Faraday rotator of the invention is characterized in that the garnet material is used in the state immediately under saturation magnetization, the rotator has an automatic temperature compensation function, and has great Faraday rotatability because of the large Bi content. If the amount of the element M is small (i.e., if w is small), the saturation magnetization is as much as about 1.6 kG, and the magnet for magnetizing to a slightly less magnetization of about 1.5 kG has to be a little larger in size. This tends to necessitate a corresponding increase in the overall dimensions of the Faraday rotator. Increasing the amount of the element M is desirable in that it abates the saturation magnetization of the garnet material and permits a reduction in size of the Faraday rotator. The reason why the magnet is large where the M content is small is that the magnet should be made long enough to provide a uniform magnetic field and, wherever possible, avoid the adverse effect of the magnet configuration, so that the garnet material may be used without saturation.

BRIEF DESCRIPTION OF THE DRAWINGS

FIG. 9 shows the magnetic domain structures of: (a) a perpendicular magnetization magneto-optical material; (b) two pieces of magneto-optical material disposed side by side; and (c) two pieces of magneto-optical material spaced apart with nonmagnetic substrates in between;

DETAILED DESCRIPTION OF THE INVENTION

Figure 2:
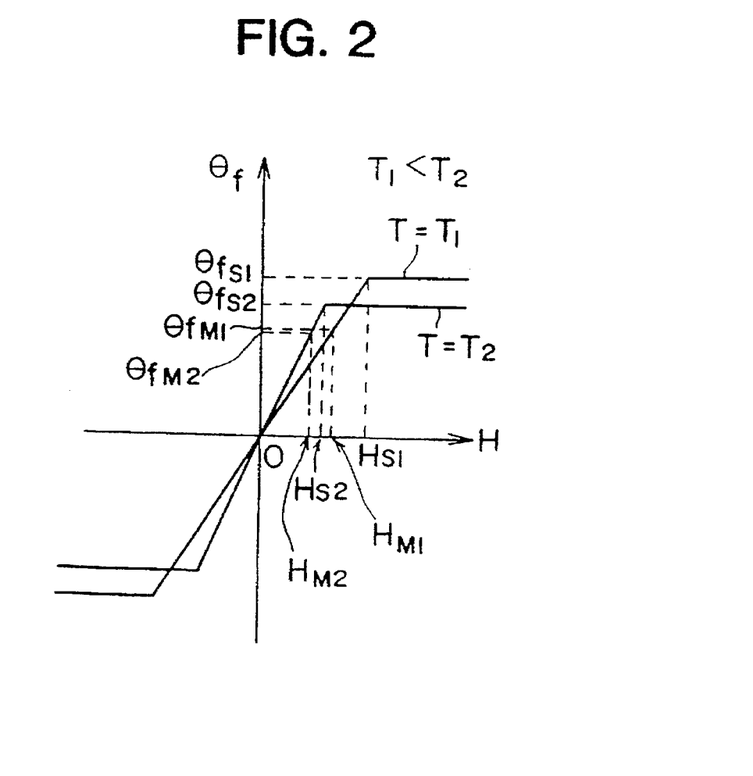
FIG. 2 is a graph illustrating the principles of the present invention.

The principle of temperature compensation according to the invention will now be explained with reference to FIG. 2. In the figure is shown the relation between the Faraday rotation angle $\Theta_F$ at two temperatures $T_1 < T_2$ and a magnetic field H.

Under the invention the applied magnetic field $H_M$ is fixed to be smaller than the saturation magnetic field $H_s$, and what matters is not the Faraday rotation angle $\Theta_{fs}$ when saturated but the Faraday rotation angle $\Theta_{fM}$ when the magnetic field $H_M$ smaller than the saturation magnetic field is applied. A magnet provides a magnetic field which becomes weaker as the temperature rises ($H_{M1} > H_{M2}$, the subscript numerals corresponding to the temperatures $T_1$, $T_2$, respectively). On the other hand, with a material of the composition according to the invention, the temperature rise increases the inclination of the unsaturated portion, so that $\Theta_{fs1}/H_{s1} < \Theta_{fs2}/H_{s2}$. Thus, despite a reduction of the magnetic field due to a temperature increase, the Faraday rotation angle is large as shown, and a Faraday rotator substantially free from variation with temperature is obtained. Also, because the temperature coefficient of the unsaturated portion of a garnet element of the composition conforming to the invention is by far the smaller than that of the saturated portion, a far more stable rotation angle than heretofore is obtained irrespective of the rate of decrease due to temperature of the magnetic flux of the magnet. Although a magnet with a temperature coefficient of zero gives a better result than before, a magnet of a low temperature coefficient, e.g., of the rare earth-cobalt system produces an even improved effect, since the temperature coefficient of a magnet generally is zero. For example, the rare earth-cobalt magnets usually used for optical isolators have $H_M$ temperature coefficients in the range from –0.03 to –0.045%/°C. With other magnets too, negative temperature coefficients are common.

After all, the temperature variation of the rotation angle becomes the least when the temperature variation of $H_M$ and that of $V = \Theta_{fs}/H_s$ offset each other.

When the M content is low, the saturation magnetization of the garnet material (Faraday rotator element) is approximately 1.5 kG, and the magnet as a component member of the Faraday rotator has to be somewhat large in size. When the M content is large, the saturation magnetization decreases, e.g., to about 1.1 G (and accordingly the $H_{s1}$ and $H_{s2}$ in FIG. 2 become smaller) and hence the magnet can be reduced in size.

Usually, the rare earth-cobalt magnets employed for optical isolators range in temperature coefficients for $H_M$ from –0.03 to –0.045%/°C., and generally the temperature coefficients of other magnets are negative too. With rare earth-iron garnets, the temperature variation of $V = \Theta_{fs}/H_s$ varies with the composition of the rare earth-iron garnet; proper combination permits general reduction of the temperature coefficient.

Garnet Material

Next, the garnet material used in the present invention will be described. The temperature coefficient of $V = \Theta_{fs}/H_s$ varies with the composition of a rare earth-iron garnet. It is known that, with $Bi_xP_yQ_{3-x-y}Fe_{5-w}M_wO_{12}$, P (Y, La, Sm, Eu, Tm, Yb, or Lu) makes the temperature variation of V positive, allowing the latter and the temperature variation of the magnet to offset each other. On the other hand, Q (Gd, Tb, Dy, Ho, or Er) is known to make the temperature variation of V negative. The temperature coefficient of the garnet material can be adjusted so as to cancel out the temperature variation of the magnetic field of the magnet. The values of X are preferably in the range of $0.7 \leq X \leq 2.0$. The values $0.7 < X$ are not preferred because the Faraday rotatability decreases when the Bi substitution is small. The values $X > 2$ are also not preferred because excessive Bi substitution renders the liquid phase epitaxy (LPE) growth difficult. With P, $0.5 \leq y \leq 2.3$ is effective in making the temperature variation of V positive. This effect is intended to offset the effect of making the temperature variation of V negative by $0 \leq 3-x-y \leq 1$ for Q. The amount of M is related to saturation magnetization.

Saturation magnetization can be reduced by replacing Fe with a nonmagnetic element M. It has been found that an element M capable of substituting for the site d of Fe, or an element D, can lower saturation magnetization. In contrast with this, an element M that can substitute for the site a of Fe, or an element A, has a reverse effect. Its presence in a small amount in relation to the element in the site d is not objectionable, though. Thus, specifically in the composition of garnet material according to the invention, $M_w$ is allowed to be w=0 to 1.0. If the device is to be reduced in size, it is advisable to choose w=0.2 to 0.7 and, in $A_kD_l$ (w=k+l), particularly satisfy the conditions $0 \leq k < 0.1$ and $0.2 \leq l \leq 0.7$.

The element A that constitutes a nonmagnetic ion capable of substituting for the site a of the garnet is, e.g., Sc or In, and the element D capable of substituting for the site d of the garnet is, e.g., Ga or Al.

To be more specific, a desirable composition is $Bi_{1.5}Y_{1.5}Fe_5O_{12}$ (where M is not contained) or, if the Faraday rotator is to be smaller in size, e.g., $(YLaHo)_{1.6}Bi_{1.4}Fe_{4.5}(Ga,Al)_{0.5}O_{12}$ (where Ho/Y=0.25 and La/(Y+La)=0.1). For example, a composition which is the same as the latter but is free from Al has the following characteristics:

Saturation magnetization=0.9 kG

Faraday rotation angle $\Theta_f$=1900 deg/cm (up to 1300 nm)

Temperature characteristic of Verdet's constant—+0.03%/°C.

Lattice constant=12.496 Å

That which did not have a nonmagnetic substitution ion in the site d, by contrast, exhibited a saturation magnetization of about 1700 G.

Designing a Magnet

Figure 3:
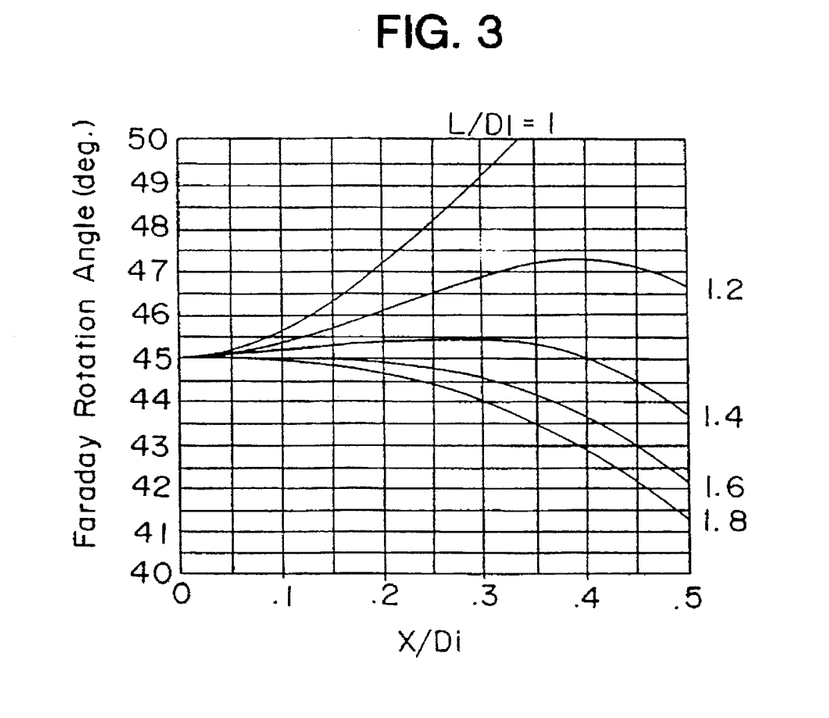
FIG. 3 is a graph showing the influences the radial distance of a cylindrical magnet and the length (based on the inside diameter) of the magnet exert upon Faraday rotation angle.
Figure 5:
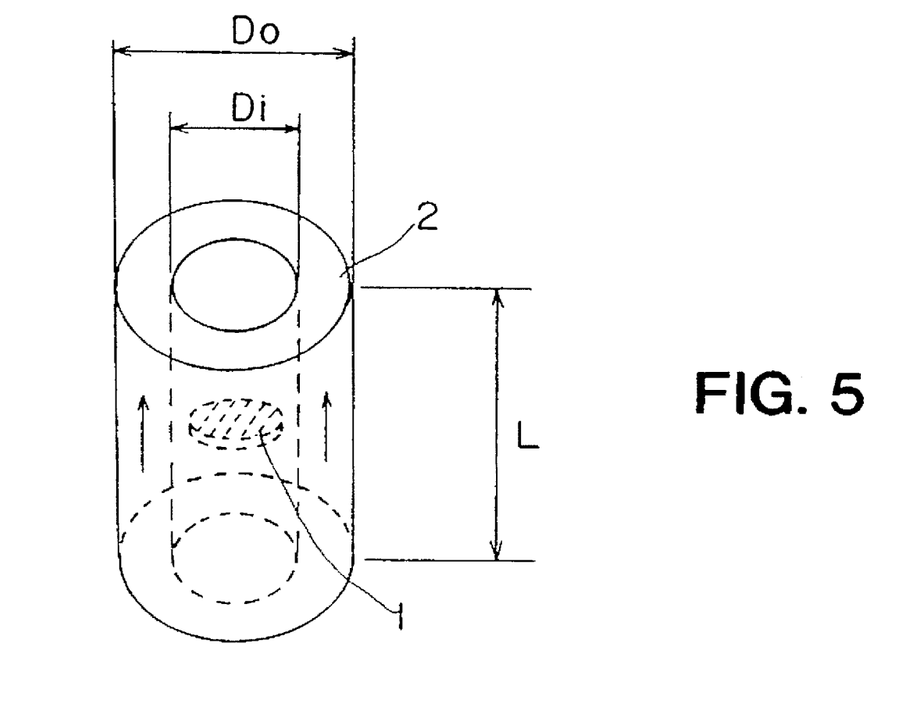
FIG. 5 is a perspective view showing the dimensions of a magnet and the location of a Faraday rotator element for use in the Faraday rotator according to the invention.
Figure 6:
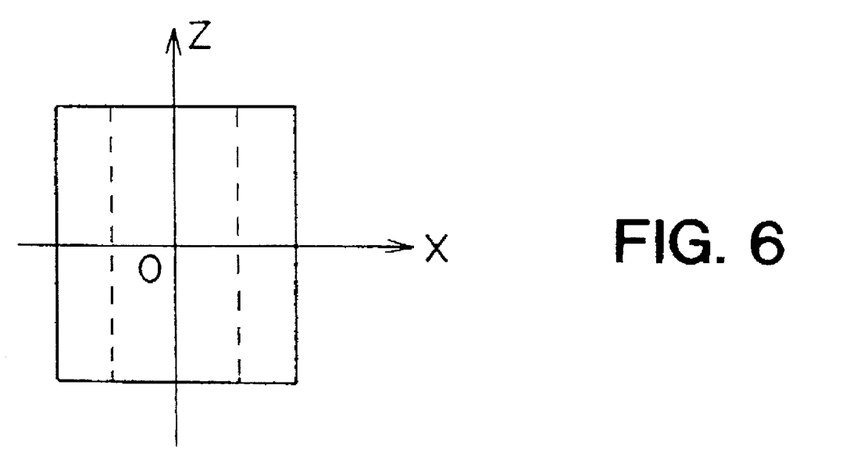
FIG. 6 is a front view of the assembly of FIG. 5, showing how the coordinates are given.

One problem encountered by the present invention is the locally non-uniform distribution of the Faraday rotation angle. In the prior art the garnet material is saturated and, in the presence of a magnetic field beyond saturation magnetization, the distribution of the Faraday rotation angle is favorable even if the magnetic field distribution is inappropriate. Under the present invention the material is not saturated and the magnetic field distribution is directly reflected in the distribution of the Faraday rotation angle. FIG. 3 graphically represents an example of calculated distribution of the Faraday rotation angle in degrees. As illustrated in FIG. 5, the magnet 2 used for the calculation was a cylinder having an inside diameter Di, outside diameter Do, and length L. A disc-shaped Faraday rotator element 1 of garnet material was disposed in the center of the cylinder. With the center of the magnet as the origin, as in FIG. 6, coordinates x and z were given in the radial and axial directions, respectively. Do was fixed to be 1.5 times as large as Di. The Faraday rotation angle, presumed to be 45 deg. at x=0, was calculated as directly proportional to the magnetic field.

As is obvious from FIG. 3, the distribution of rotation angle varies largely with the shape of the magnet. The material according to the invention has great Faraday rotatability and is thin (about 0.5 mm thick), and therefore the magnetic field distribution in the longitudinal direction can be disregarded.

Figure 4:
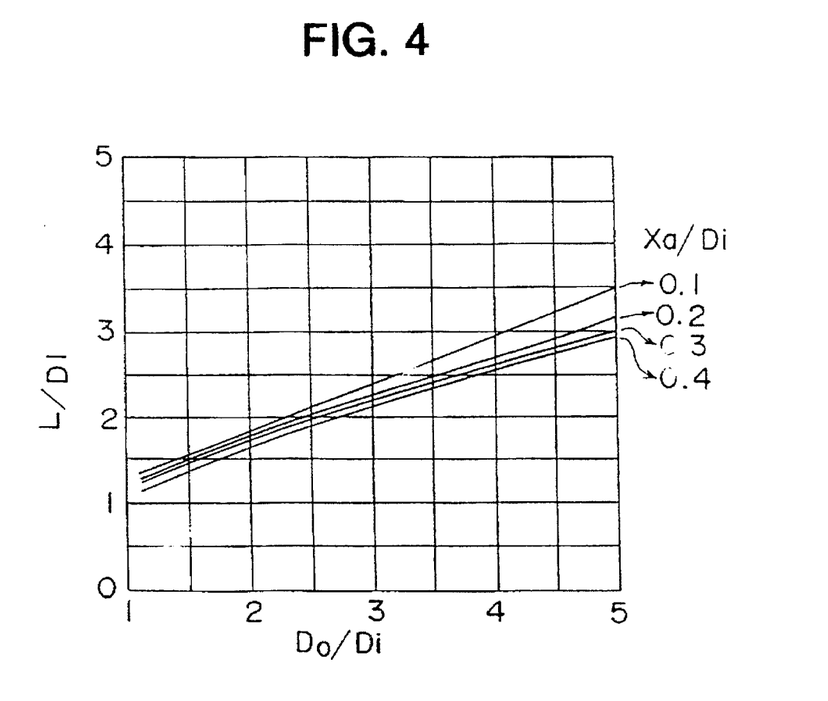
FIG. 4 is a graph showing magnet dimensions that produce a uniform magnetic field, i.e., the relation between the inside diameter-based length and the outside diameter of a magnet.

FIG. 4 shows the conditions for equalizing the magnetic field Hz in the center of the magnet (X=0, Y=0) to an off-center magnetic field (X=Xd). The Xd is fixed according to the intended use (the diameter of the light beam).

The relation that satisfies the above conditions, assuming that the outside diameter is Do, the inside diameter Di, and the length L, is:

$$L/Di=(0.4-1.0)+0.5Do/Di$$

If the outside diameter is more than five times as large as the inside diameter, the reduction in size becomes difficult. Hence, Do is fixed to be less than five times Di.

Desirable concrete dimensions are as follows.

Material thickness:—Because of the large amount of Bi substitution, the thickness is 0.5 mm or less for a 45-deg. rotator for wavelengths 1.3 μm or 1.55 μm.

Material size:—Usually from 1.5 to 5 mm. The larger the diameter of the light beam handled, the larger the size should be.

Inside diameter of the magnet:—Large enough to accommodate the garnet material.

Length and outer shape of the magnet:—Chosen by calculation from the above relation.

Strength of magnetic field:—Weaker than the saturated magnetic field.

Figure 7:
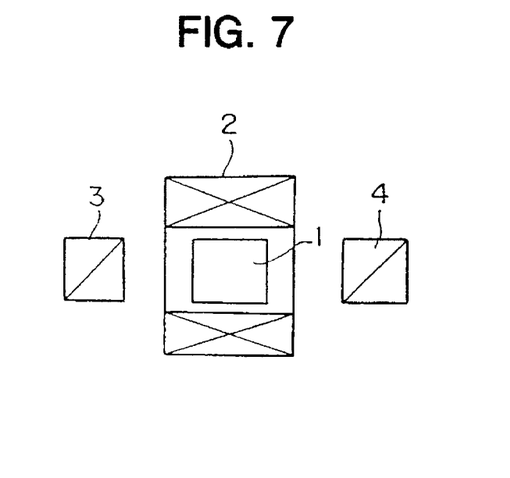
FIG. 7 is a diagrammatic view of an isolator incorporating the present invention.

FIG. 7 illustrates an isolator incorporating a Faraday rotator according to the invention. A rare earth-iron garnet crystal element 1 is located in a uniform magnetic field provided by a permanent magnet 2. The magnetic field is produced by the magnet of the strength, shape, and size adjusted for use at as large a rotation angle possible within the region where the element 1 is not saturated. For the purposes of the invention the term "Faraday rotator" is intended to mean the combination of this garnet element 1 and the magnet 2. The numeral 3 designates a polarizer for incident rays and 4, a polarizer for outgoing rays. These polarizers are so arranged as to transmit incident rays through the Faraday rotator but completely shut off the rays reflected from an optical fiber or the like.

Figure 8:
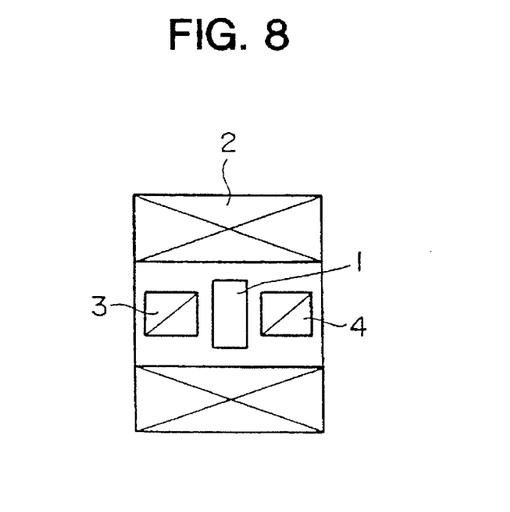
FIG. 8 is a diagrammatic view of a modified form of isolator according to the invention.

FIG. 8 shows another arrangement according to the invention in which a garnet material with a large $M_w$ content is used. Since the preset magnetic field of the magnet is small, the magnet itself can be reduced in size.

Solution of Unsaturation Magnetization Problems

Figure 9A:
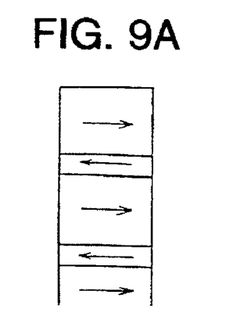
Figure 9B:
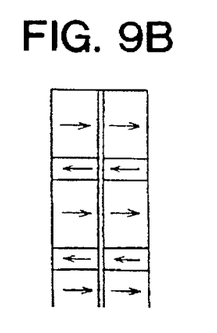
Figure 9C:
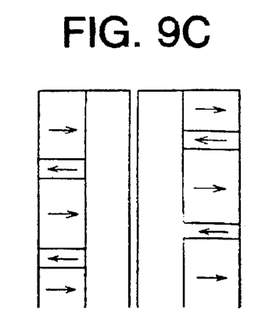

However, the application of a magnetic field smaller than the saturation magnetic field presents new problems. A magnetic garnet material largely substituted for by Bi is usually perpendicularly magnetized and has a multiple magnetic domain structure as indicated at (a) in FIG. 9. When a linear polarized light parallel to the direction of magnetization is incident on such a multi-domain structure, the Faraday effect causes the plane of polarization to rotate. In the magnetic domains A1, A2, and A3 where the magnetization is in the same direction as the advance of light, the polarization plane of light rotates by $+\Theta_f$. In the domains B1 and B2 where the direction of magnetization is reverse, the plane rotates by $-\Theta_f$. The difference in rotation angle between the planes of polarization by magnetic domains results in diffraction. Such a multiple magnetic domain structure remains even when a magnetic field smaller than the saturation magnetic field is applied. Upon incidence of light the multidomain structure acts as a diffraction grating, diffracting part of the incident rays. This leads to diffraction loss of the detected light.

It is therefore necessary to reduce the diffraction loss with the perpendicular magnetization garnet material, while abating the temperature variation of Faraday rotation angle. To this end, a plurality of pieces of perpendicular magnetization garnet material were used in mutually spaced relation or a material having in-plane components were used. In either way a Faraday rotator was successfully made which could eliminate the temperature variation of Faraday rotation angle, abate the loss of detected light due to diffraction, or preclude the possibility of diffraction.

Thus, one approach is arranging two or more pieces of perpendicular magnetization garnet material spaced from one another. The material of the composition specified above is usually grown on a single crystal substrate by the LPE technique. Growth-induced magnetic anisotropy then produces perpendicular magnetization as shown at (a) in FIG. 9.

Figure 10:
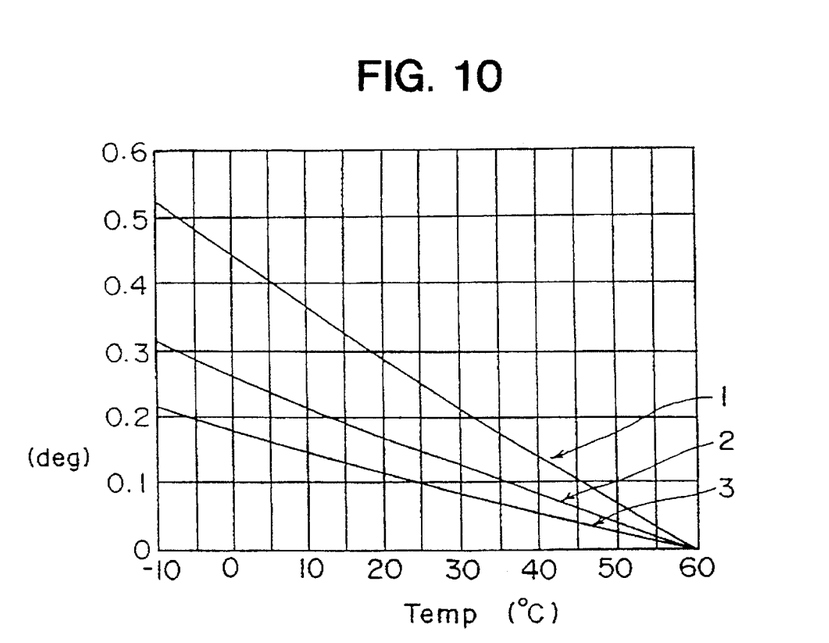
FIG. 10 is a graph showing the relation between diffraction loss and temperature varying with the number of pieces of magneto-optical material.
Figure 11:
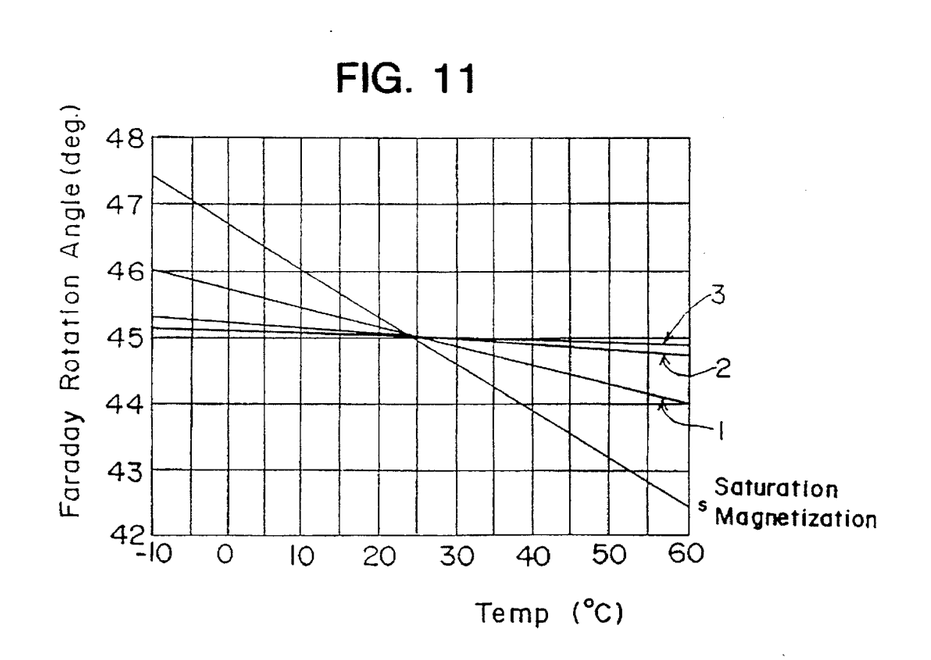
FIG. 11 is a graphic representation of the temperature dependence of Faraday rotation angle.

FIG. 10 is a graph showing temperature versus diffraction loss with different arrangements; a single piece of a perpendicular magnetization material, two pieces spaced apart, and three pieces separated from one another. The diffraction loss values at different temperatures were calculated for the one-, two-, and three-piece elements from the following equation for finding transmittivity T (for a single-piece perpendicular magnetization material):

$$T=\cos^2\Theta_{fs}+(M/M_s)^2\sin^2\Theta_{fs}$$

where $\Theta_{fs}$ is saturated Faraday rotation angle, M is magnetization, and $M_s$ is saturated magnetization, $\Theta_{fs}$, M, and $M_s$ being all dependent on temperature. It will be appreciated from the graph that the diffraction loss of incident rays at each temperature is less and the transmitted light is more effectively detected with multiple-piece elements than with a single-piece element of perpendicular magnetization material.

The multiple-piece element of garnet material must be arranged so that the pieces are spaced from one another to keep the individual magnetic layers out of contact. For example, if two pieces of garnet material are disposed with their magnetic layers in contact as shown at (b) in FIG. 9, the magnetic domain structure is equivalent to that of a single-piece element. It will not offer the unique advantage of the invention: the reduction of diffraction loss. For this reason the arrangement should keep the magnetic layers of garnet material out of contact, as at (c) in FIG. 9. The distance between the magnetic layers of garnet material, as shown, is just long enough to keep the magnetic domain structures of the two pieces independent of each other. The spacing is accomplished in a variety of ways, including the provision of a spacer in between. When a garnet material made by the LPE technique is used, it is expedient, as illustrated at (c), to dispose two pieces each consisting of a magnetic layer grown over a nonmagnetic substrate, with the substrates held back to back.

FIG. 10 graphically summarizes the results of measurements made on the temperature dependence of Faraday rotation angle when a saturation magnetic field and a smaller magnetic field were applied to one-, two-, and three-piece elements of perpendicular magnetization material. As measuring conditions, the saturation magnetic field was fixed to be 1.45 kOe and the smaller applied magnetic field, 1.37 kOe (at 25° C.), and the perpendicular magnetization material used was $Bi_{1.5}Y_{1.3}Gd_{0.2}Fe_5O_{12}$. The graph clearly indicates that the adoption of two- or more multiple-piece element is advisable in respect of the temperature variation of Faraday rotation angle.

The other approach is the use of a garnet material in which the magnetization has in-plane components when no magnetic field is applied.

Figure 12A:
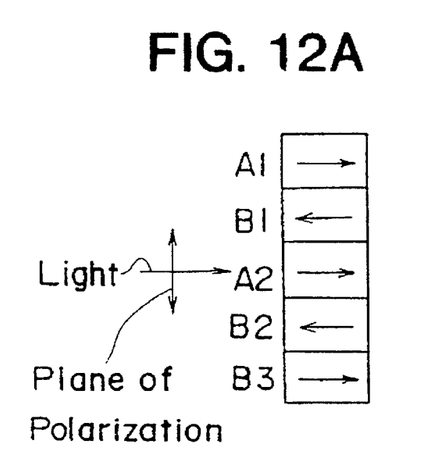
FIG. 12 shows (a) the magnetic domain structure of a perpendicular magnetization magneto-optical material; and (b) that of an magneto-optical material whose magnetization has in-plane components.
Figure 12B:
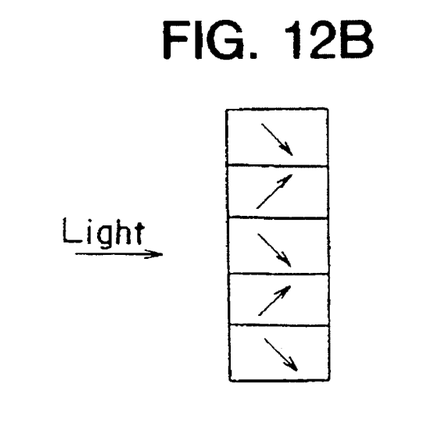

The garnet material in which the magnetization has in-plane components does not act as a diffraction grating for incident rays and inflicts no diffraction loss. The expression "magnetization has in-plane components" as used herein denotes not merely the case in which the magnetization has only in-plane components as in FIG. 12 (b) but also the case in which it has both in-plane and perpendicular components. At (b), unlike at (a), the magnetization components (perpendicular components) parallel to the direction in which light travels are the same throughout the magnetic domains. Thus, whatever domain the light passes, the Faraday rotation angle is the same and no diffraction of light results. As this type of material, from the viewpoint of abating the temperature variation of Faraday rotation angle, a material of the specified composition $Bi_xP_yQ_{3-x-y}Fe_{5-w}M_wO_{12}$ may be used.

A material in which the magnetization has in-plane components can be made, for example, by either cutting out a bulk material made by the flux method or the like into pieces in which the magnetization has in-plane components or annealing a material made by the LPE method at a temperature of 1000° C. or above. In the latter, the growth-induced magnetic anisotropy disappears on annealing, and orientation is established so that the magnetization has in-plane components.

The invention will now be described in detail in connection with examples thereof which are in no way limiting.

EXAMPLE 1

A material of the composition $Bi_{1.5}Y_{1.5}Fe_5O_{12}$ was made by the LPE method. The saturation magnetic field was about 1700 Oe, the rotatability at the wavelength of 1.3 µm was 2900 deg/cm, and the temperature coefficient for $\Theta_{fs}$ was −0.13%/°C. and that for $V=\Theta_{fs}/H_s$ was +0.03%/°C.

The material, cut into a piece measuring 2 mm by 2 mm by 0.18 mm thick, was held in the center of a hollow cylinder 3 mm in inside diameter, 5 mm in outside diameter, and 5 mm long of a rare earth-cobalt magnet (temperature coefficient −0.03%/°C. and center magnetic field 1500 Oe) to provide a Faraday rotator. The Faraday rotation angle was 45° and the temperature coefficient of the rotation angle was approximately zero.

Prior Art Example

The above material, measuring 2 mm square by 0.16 mm thick, was held in the center of a hollow cylinder 3 mm in inside diameter, 5.5 mm in outside diameter, and 2.5 mm long of a rare earth-cobalt magnet (center magnetic field 2000 Oe). The Faraday rotator thus obtained gave inferior results, with the Faraday rotation angle at room temperature of 45° and a temperature coefficient of −0.13%/°C.

EXAMPLE 2

A material $(YLaHo)_{1.6}Bi_{1.4}Fe_{4.5}(Ga,Al)_{0.5}O_{12}$ in which Ho/Y=0.25 and La/(Y+La)=0.1) was made by the LPE technique. Its saturation magnetic field was about 900 Oe, rotatability at the wavelength of 1.3 µm was 1900 deg/cm, and temperature coefficient for $\Theta_{fs}$ was −0.13%/°C. and that for $V=\Theta_{fs}/H_s$ was +0.03%°C.

A piece of the above material 2 mm by 2 mm by 0.25 mm thick was held in the center of a hollow cylinder 3 mm in inside diameter, 4.5 mm in outside diameter, and 4.2 mm long of a rare earth-cobalt magnet (temperature coefficient −0.03%/°C. and center magnetic field 850 Oe). The rotation angle of the resulting Faraday rotator was 45° and the temperature coefficient of the rotation angle was approximately zero.

EXAMPLE 3

A material $(YLaHo)_{1.6}Bi_{1.4}Fe_5O_{12}$ (Ho/Y=0.25 and La/(Y+La) =0.1), which was the same as used in Example 2 except that Fe was not in the least substituted for by M, had a saturation magnetization of about 1700 G. In order to obtain the same results as with Example 2, it had to be set in a hollow cylinder 3 mm in inside diameter, 6 mm in outside diameter, and 5.7 mm long of rare earth-cobalt magnet (temperature coefficient −0.03%/°C. and center magnetic field of 1800 Oe).

EXAMPLE 4

Using a Perpendicular Magnetization Material

Figure 13:
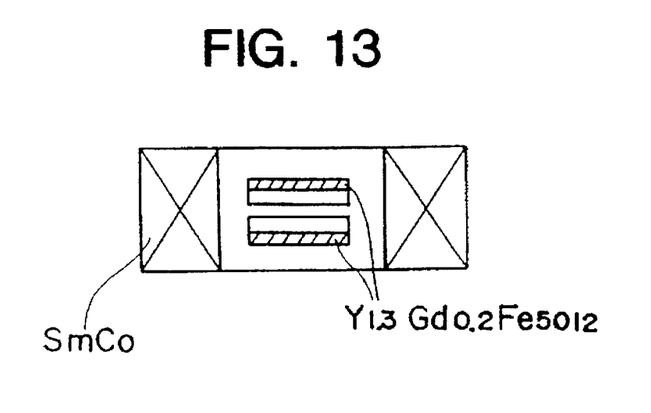
FIG. 13 shows the arrangement of a perpendicular magnetization magneto-optical material and a magnet made in Example 4.

A material of the composition $Bi_{1.5}Y_{1.3}Gd_{0.2}Fe_5O_{12}$ was grown over a single crystal substrate by the LPE technique. It was polished to a film thickness of about 100 µm, and two elements incorporating the material, in a spaced vertical arrangement, were placed in a samarium-cobalt magnet as shown in FIG. 13. The center magnetic field was about 1.4 kOe. This Faraday rotator was found quite superior in transmittivity and temperature variation, with a rotation angle at 25° C. of 45°, loss of 0.2 dB, rotation angle temperature characteristic of approximately −0.01°/°C.

EXAMPLE 5

Using In-plane Magnetization Material

The material used in Example 4 was heat-treated in air at 1050° C. for 12 hours until the magnetization had in-plane components. The material was polished to a thickness of about 200 µm and, in the same manner as in Example 1, the resulting elements were disposed in the center of a samarium-cobalt magnet. The center magnetic field was about 1.5 kOe. This Faraday rotator exhibited outstanding transmittivity and temperature variation, with a rotation angle at 25° C. of 45°, loss of no more than 0.1 dB, and rotation angle temperature characteristic of about −0.01°/°C.

In brief, the present invention presents the following advantages:

(1) The Faraday rotator of the invention undergoes only limited temperature variation of Faraday rotation angle.

(2) The garnet material for the Faraday rotator of the invention, which is largely substituted for by Bi, has great Faraday rotatability and can be thinner than ordinary materials. Hence it is easy to form by the LPE technique.

(3) Size reduction of magnet is made possible because smaller saturation magnetization enables a smaller magnetic field to magnetize the garnet material.

(4) The problems associated with the diffraction of light can be overcome by the use of either a plurality of pieces of garnet material or a material having only in-plane magnetization components.

What is claimed is:

1. A Faraday rotator having a predetermined fixed rotation angle and comprising, in combination, a garnet material of a composition $Bi_xP_yQ_{3-x-y}Fe_{5-w}M_wO_{12}$ in which P is one or more elements selected from the group consisting of Y, La, Sm, Eu, Tm, Yb, and Lu, Q is one or more elements selected from the group consisting of Gd, Tb, Dy, Ho, and Er, M is one or more non-magnetic elements that can partly substitute for Fe, and $0.7 \leq x \leq 2.0$, $0.5 \leq y \leq 2.3$, $0 \leq 3-x-y \leq 1$, and $0 \leq w \leq 1.0$, and a permanent magnet means for applying to said material an operating magnetic field smaller than the saturation magnetic field of said material for imparting temperature stability to the rotation angle of the rotator, said garnet material being fixedly disposed at a location relative to said magnet to establish said predetermined fixed rotation angle.

2. A Faraday rotator according to claim 1 wherein w satisfies $0.2 \leq w \leq 0.7$.

3. A Faraday rotator according to claim 1 wherein the garnet material in the operating magnetic field has a positive temperature coefficient, with respect to its Faraday rotation angle divided by the operating magnetic field, and the magnet has a negative temperature coefficient with respect to the operating magnetic field, so that both the garnet material and the magnet cooperate to offset the effect of the temperature change in the Faraday rotation angle.

4. A Faraday rotator according to claim 1 wherein $M_w$ is a combination of non-magnetic elements $A_k$ and $D_l$ that can be substituted for sites a and d respectively of Fe in the garnet material, and $0 \leq k \leq 0.1$, $0.2 \leq l \leq 0.7$, and $w = k+l$.

5. A Faraday rotator according to claim 1 wherein the garnet material is two or more pieces of perpendicular magnetization garnet optical material which are disposed in spaced relation.

6. A Faraday rotator according to claim 1, wherein the garnet material has in-plane components of magnetization when placed in a condition where no magnetic field is applied.

7. A Faraday rotator having a predetermined fixed rotation angle and comprising, in combination, a garnet material of a composition $Bi_xP_yQ_{3-x-y}Fe_{5-w}M_wO_{12}$ in which P is one or more elements selected from the group consisting of Y, La, Sm, Eu, Tm, Yb, and Lu, Q is one or more elements selected from the group consisting of Gd, Tb, Dy, Ho, and Er, M is one or more non-magnetic elements that can partly substitute for Fe, and $0.7 \leq x \leq 2.0$, $0.5 \leq y \leq 2.3$, $0 \leq 3-x-y \leq 1$, and $0 \leq w \leq 1.0$, and a permanent magnet means for applying to said material an operating magnetic field smaller than the saturation magnetic field of said material for imparting temperature stability to the rotation angle of the rotator, and the magnet has an outside diameter $D_o$, inside diameter $D_i$, and length L that satisfy the relation $$L/D_i = (0.4 \text{ to } 1.0) + 0.5 D_o/D_i$$

$$D_o/D_i < 5$$

the magnetizing direction of the magnet being longitudinal, and the garnet material is disposed approximately in the hollow center of said magnet.

8. A Faraday rotator having a predetermined fixed rotation angle and comprising, in combination, a garnet material of a composition $Bi_xP_yQ_{3-x-y}Fe_{5-w}M_wO_{12}$ in which P is one or more elements selected from the group consisting of Y, La, Sm, Eu, Tm, Yb, and Lu, Q is one or more elements selected from the group consisting of Gd, Tb, Dy, Ho, and Er, M is one or more non-magnetic elements that can partly substitute for Fe, and $0.7 \leq x \leq 2.0$, $0.5 \leq y \leq 2.3$, $0 \leq 3-x-y \leq 1$, and $0 \leq w \leq 1.0$, and a permanent magnet means for applying to said material an operating magnetic field having a substantially fixed magnitude at a given temperature, said magnitude being smaller than the saturation magnetic field of said material for imparting temperature stability to the rotation angle of the rotator, said garnet material being fixedly disposed at a location relative to said magnet to establish said predetermined fixed rotation angle.

9. A Faraday rotator having a predetermined fixed rotation angle and comprising, in combination, a garnet material of a composition $Bi_xP_yQ_{3-x-y}Fe_{5-w}M_wO_{12}$ in which P is one or more elements selected from the group consisting of Y, La, Sm, Eu, Tm, Yb, and Lu, Q is one or more elements selected from the group consisting of Gd, Tb, Dy, Ho, and Er, M is one or more non-magnetic elements that can partly substitute for Fe, and $0.7 \leq x \leq 2.0$, $0.5 \leq y \leq 2.3$, $0 \leq 3-x-y \leq 1$, and $0 \leq w \leq 1.0$, and a permanent magnet means for applying to said material an operating magnetic field having a substantially fixed magnitude at a given temperature, said magnitude being smaller than the saturation magnetic field of said material for imparting temperature stability to the rotation angle of the rotator, and the magnet has an outside diameter $D_o$, inside diameter $D_i$, and length L that satisfy the relation $$L/D_i = (0.4 \text{ to } 1.0) + 0.5 D_o/D_i$$

$$D_o/D_i < 5$$

the magnetizing direction of the magnet being longitudinal, and the garnet material is disposed approximately in the hollow center of said magnet.

\* \* \* \* \*